United States Patent
Zhou et al.

(10) Patent No.: US 11,079,631 B2
(45) Date of Patent: Aug. 3, 2021

(54) PREPARATION METHOD FOR A TEMPERATURE-RESPONSIVE LIGHT REFLECTING COATING AND THE LIGHT REFLECTING COATING

(71) Applicants: South China Normal University, Guangdong (CN); Shenzhen Guohua Optoelectronics Co., Ltd., Guangdong (CN)

(72) Inventors: Guofu Zhou, Guangdong (CN); Laurens De Haan, Guangdong (CN); Pei Zhang, Guangdong (CN); Wei Zhao, Guangdong (CN)

(73) Assignees: SOUTH CHINA NORMAL UNIVERSITY, Guangdong (CN); SHENZHEN GUOHUA OPTOELECTRONICS CO., LTD., Guangdong (CN)

( * ) Notice: Subject to any disclaimer, the term of this patent is extended or adjusted under 35 U.S.C. 154(b) by 0 days.

(21) Appl. No.: 16/495,787

(22) PCT Filed: May 4, 2018

(86) PCT No.: PCT/CN2018/085664
§ 371 (c)(1),
(2) Date: Apr. 27, 2020

(87) PCT Pub. No.: WO2019/196151
PCT Pub. Date: Oct. 17, 2019

(65) Prior Publication Data
US 2020/0257170 A1 Aug. 13, 2020

(30) Foreign Application Priority Data
Apr. 9, 2018 (CN) .......................... 201810310280.4

(51) Int. Cl.
*G02F 1/1337* (2006.01)
*C09K 19/20* (2006.01)
*C09K 19/38* (2006.01)
*C09D 5/33* (2006.01)
*C09K 19/04* (2006.01)

(52) U.S. Cl.
CPC .... *G02F 1/133711* (2013.01); *C09K 19/2007* (2013.01); *C09K 19/3804* (2013.01); *C09D 5/004* (2013.01); *C09K 2019/0448* (2013.01); *C09K 2019/2078* (2013.01); *G02F 1/133726* (2021.01)

(58) Field of Classification Search
CPC ............ C09K 2323/00; C09K 2323/02; C09K 2323/03; C09K 19/2007; C09K 19/3804; C09K 2019/0448; C09K 2019/2078; G02F 1/133711; G02F 1/133726; C09D 5/004
USPC ...... 428/1.1, 1.2, 1.3; 427/553, 557; 349/16, 349/88, 185
See application file for complete search history.

(56) References Cited

U.S. PATENT DOCUMENTS

2005/0244590 A1   11/2005  Hiji et al.
2013/0107193 A1*  5/2013  Hamada ............... G02B 5/3016
                                                                      349/193
2019/0077071 A1*  3/2019  Ware ...................... B29C 71/04

FOREIGN PATENT DOCUMENTS

| CN | 1715309 A | 1/2006 |
|---|---|---|
| CN | 104793381 A | 7/2015 |
| CN | 105425327 A | 3/2016 |
| CN | 106338854 A | 1/2017 |
| JP | 2003226682 A | 8/2003 |

\* cited by examiner

*Primary Examiner* — Ruiyun Zhang
(74) *Attorney, Agent, or Firm* — Leason Ellis LLP

(57) ABSTRACT

A preparation method for a temperature-responsive light reflecting coating is provided comprising: forming a main chain cholesteric phase liquid crystal polymer by a polymerization reaction between an acrylate liquid crystal and an amine, and coating the main chain cholesteric phase liquid crystal polymer on a substrate to form a light reflecting coating, wherein the acrylate comprises a chiral acrylate, and the reflection wavelength of the reflecting coating is determined by the content of the chiral acrylate liquid crystal and the polymerization degree of the main chain cholesteric phase liquid crystal polymer formed. The method may further comprise cross-linking the main chain cholesteric phase liquid crystal polymer to obtain a polymer network so as to form a solid coating. The present disclosure further provides a temperature-responsive light reflecting coating. The preparation of the main chain cholesteric phase liquid crystal polymer of the present disclosure requires only a simple thermally-driven polymerization reaction.

11 Claims, 5 Drawing Sheets

| Examples | Diacrylate liquid crystal $R_1$ | | Primary amine $R_2$ | |
|---|---|---|---|---|
| | | 2-methyl-1,4-phenylene ester of (4-((6-acryloyloxy)hexyl)oxyl) methyl benzoate | | Butylamine |
| | | 1,4-phenylene-bis(4-(11-(acryloyloxy)undecyl)oxyl)benzoate) | | Decylamine |
| | | (4-((11-(acryloyloxy)undecyl)oxyl)benzoic acid-2-met | | Dodecylamine |

Fig.2

| | | |
|---|---|---|
| hyl-1,4-phenylene ester) |  | Glycine |
| (4-((4-((acryloyloxy)butoxy)carbonyl)benzoyl)oxy}(3R,3aS,6R,6aS)-hexahydrofuro[3,2-b]furan-3,6-diyl) benzoate) |  | ...... |

PREPARATION METHOD FOR A TEMPERATURE-RESPONSIVE LIGHT REFLECTING COATING AND THE LIGHT REFLECTING COATING

REFERENCE TO RELATED APPLICATION

This application is the United States National Stage entry under 35 U.S.C. 371 of PCT/CN2018/085664 filed on May 4, 2018, which in turn claims the priority of Chinese patent application No. 201810310280.4 "PREPARATION METHOD FOR A TEMPERATURE-RESPONSIVE LIGHT REFLECTING COATING AND THE LIGHT REFLECTING COATING" filed on Apr. 9, 2018, both of which are hereby incorporated by reference in their entirety.

TECHNICAL FIELD

The present disclosure belongs to the field of liquid crystal reflecting coating, and in particular belongs to a preparation method for a temperature-responsive light reflecting coating and the light reflecting coating.

BACKGROUND

Liquid crystal-based devices play an important role in daily life, especially in the field of liquid crystal displays. These liquid crystal materials consist of rod-like molecules which all point in the same direction. This property allows the liquid crystals to be in an ordered phase and still flow like a liquid. A special case is the cholesteric liquid crystal, which is very important for the preparation of various photonic systems. This phase appears when a nematic material/mixture is wholly or partially composed of molecules containing a chiral center. In this phase, due to the continuous rotation of the director, the molecules form a helical structure. This phase has the special property of reflecting light of a certain wavelength band based on the distance of one complete director rotation (i.e. pitch). The light is reflected only when its circular polarization handedness is the same as the handedness of the cholesteric helical structure, which is 50% of non-polarized light. The pitch and the reflection wavelength determined therefrom depend on the type and number of chiral molecules in the material. A larger number of chiral molecules may result in shorter pitch and shorter reflection wavelength. Therefore, the wavelength of light to be reflected by the material can be adjusted using this property.

For many cholesteric liquid crystal materials, their pitch may change in response to external stimuli, which further results in a change of the wavelength of reflected light. Therefore, cholesteric liquid crystal materials are often applied in thermometers, novelty items such as mood rings, and responsive photon systems. Recent research on cholesteric liquid crystal materials focus on smart infrared reflectors, water-responsive color patterns, sensors, imaging, anti-counterfeiting measures and other applications. In these applications, the cholesteric liquid crystal material is typically prepared in a confined space, that is, in a narrow gap between two glass substrates, which is also referred to as a glass cell. Other methods of preparation include suspending the cholesteric phase liquid crystal material as droplets in a solid substrate, or printing or coating with a polymerizable cholesteric molecule and then performing cross-linking polymerization to obtain a reflecting solid coating. In the latter case, the material will be unresponsive to stimulus. Another feasible method is to prepare a hybrid network by mixing a liquid crystal polymer (in this case, a polysiloxane liquid crystal) with a non-polymeric liquid crystal that can be polymerized and cross-linked. It has been recently reported that main chain liquid crystal polymers can be prepared by mixing a diacrylate liquid crystal molecule with a chain extender such as butylamine or dithiol, and these polymers remain soft and stimulus-responsive at room temperature even after cross-linking. Reports show that they can be processed by 3D printing technology. However, cholesteric variants of these polymers have never been reported.

In current non-polymeric cholesteric liquid crystal systems, the material is typically not applied to a surface, because when a material consisting of small molecules is applied as a film on a surface, dewetting, crystallization and/or evaporation can occur causing the coating to be unstable in the long term. Direct polymerization of small molecules after coating can solve this problem but will result in unresponsiveness to stimuli. Suspending the cholesteric phase molecules in a solid substrate is also workable, but such systems scatter light which makes them unusable for applications requiring transparency, which most applications require. Instead, the material is usually placed in a confined space, such as between two glass substrates, which limits the upscaling of these devices because it is impractical to prepare liquid crystal cells for large or curved surfaces.

Some achievements have been obtained by using side chain liquid crystalline polysiloxanes, but these materials are difficult to prepare because they need a sensitive platinum catalyst. In addition, cross-linking these polymers requires the presence of cross-linkable groups in the polymer chain, which calls for additional modifications to the polymers, thereby further complicating the preparation process.

SUMMARY

In light of the above technical problems, this present disclosure provides a method for preparing a light reflecting coating based on a cholesteric phase liquid crystal material. The preparation method is simple: The temperature-responsive light reflecting coating can be obtained by applying a cholesteric phase liquid crystal polymer material on the surface of a substrate with the use of a coating technique. Further, a reflecting solid coating can be obtained by a cross-linking reaction of the cholesteric phase liquid crystal material. In view of the above technical problems, this present disclosure further provides a light reflecting coating in which the reflected wavelength changes with temperature and the cholesteric phase material does not suffer from dewetting, crystallization or evaporation during a long period of time.

The first aspect of the present disclosure is a preparation method for a temperature-responsive light reflecting coating, the method comprising: forming a main chain cholesteric phase liquid crystal polymer by a polymerization reaction between one or a mixture of diacrylate liquid crystals and an amine, and coating the main chain cholesteric phase liquid crystal polymer on a substrate to form a light reflecting coating, wherein the diacrylate comprises at least one chiral acrylate, and the reflection wavelength of the reflecting coating is determined by the content of the chiral acrylate liquid crystal and the polymerization degree of the main chain cholesteric phase liquid crystal polymer.

In a preferred embodiment of the first aspect of the present disclosure, the polymerization reaction between the acrylate liquid crystal and the amine is carried out as follows:

the amine reacts with the acrylate liquid crystal to form a secondary amine through a Michael addition reaction, and the secondary amine further reacts with another acrylate liquid crystal to form a tertiary amine.

In a preferred embodiment of the first aspect of the present disclosure, said amine is a primary amine.

In a preferred embodiment of the first aspect of the present disclosure, heating is performed when carrying out the polymerization reaction.

In a further improvement of the first aspect of the present disclosure, an alignment layer is added onto the substrate to assist in uniform alignment of molecules.

In a further improvement of the first aspect of the present disclosure, the preparation method further comprises a step of cross-linking the main chain cholesteric phase liquid crystal polymer to obtain a polymer network so as to form a solid coating.

In a further improvement of the first aspect of the present disclosure, the molar ratio of the diacrylate liquid crystal to the amine is controlled so that acrylate end groups are present in the main chain cholesteric phase liquid crystal polymers.

In a further improvement of the first aspect of the present disclosure, the method further comprises a step of adding a radical initiator to the main chain cholesteric phase liquid crystal polymer before coating the main chain cholesteric phase liquid crystal polymer onto the substrate, so that ultraviolet irradiation can be carried out to initiate a cross-linking reaction with radicals of the main chain cholesteric phase liquid crystal polymer.

According to a second aspect of the present disclosure, a temperature-responsive light reflecting coating is provided. The light reflecting coating comprises a substrate and a main chain cholesteric phase liquid crystal polymer, and the main chain cholesteric phase liquid crystal polymer is coated onto the substrate, wherein the main chain cholesteric phase liquid crystal polymer is formed by a polymerization reaction between one or a mixture of diacrylate liquid crystals and an amine, where at least one of the acrylate liquid crystals is a chiral acrylate liquid crystal, and the reflection wavelength of the reflecting coating is determined by the content of chiral acrylate liquid crystal and the polymerization degree of the main chain cholesteric phase liquid crystal polymer.

Compared to the prior art, the present disclosure has the following beneficial technical effects:

according to the preparation method for a temperature-responsive light reflecting coating of the present disclosure, the preparation of the main chain cholesteric phase liquid crystal polymer requires only a simple thermally-driven polymerization reaction, especially a thermally-driven polymerization without the need of any catalyst;

according to the preparation method for a temperature-responsive light reflecting coating of the present disclosure, various properties of the polymer, such as viscosity and end group ratio, can be adjusted by changing the ratio of the reactants acrylate liquid crystal to the amine, the polymerization temperature, and the polymerization time, which makes the reaction process flexible;

according to the preparation method for a temperature-responsive light reflecting coating of the present disclosure, a coating may be cross-linked to obtain a solid coating if necessary; and according to the temperature-responsive light reflecting coating of the present disclosure, the main chain cholesteric phase liquid crystal polymer can be coated on a large surface or a surface with abnormal shape to form a stable coating which does not suffer from dewetting, crystallization or evaporation.

DETAILED DESCRIPTION

Various embodiments of the present disclosure are detailed below with reference to the accompanying drawings.

Figure 1:
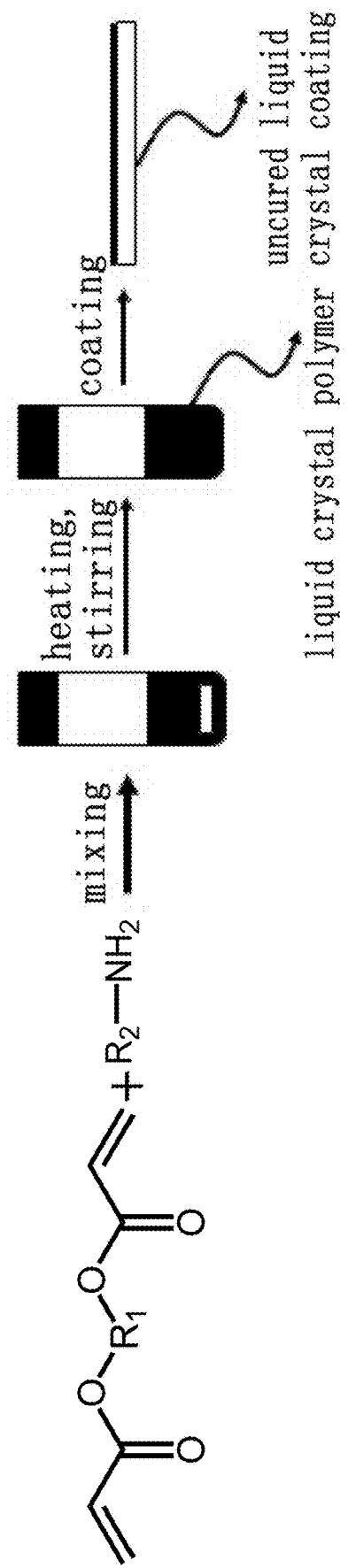
FIG. 1 is a flow diagram of a preparation method for a light reflecting coating according to an embodiment of the present disclosure.

According to a first embodiment of the present disclosure, a preparation method for a temperature-responsive light reflecting coating is provided as shown in FIG. 1, comprising: forming a main chain cholesteric phase liquid crystal polymer by a polymerization reaction between a diacrylate liquid crystal and an amine, and after the polymer reaches the desired polymerization degree in a batch reaction, coating the main chain cholesteric phase liquid crystal polymer onto a substrate to form a light reflecting coating, wherein the substrate may be glass or plastic. The diacrylate liquid crystal mixture comprises a chiral diacrylate liquid crystal which induces the formation of a cholesteric phase in the reaction mixture. The reflection wavelength of the reflecting coating is determined by the amount of chiral diacrylate liquid crystal and the polymerization degree of the main chain cholesteric phase liquid crystal polymer formed, while the polymerization degree also determines other final properties of the polymer, such as viscosity, transition temperature and pitch. It should be noted that, before completion of the polymerization reaction, the polymerization degree of the polymer increases with the reaction time, while the reaction temperature and concentration of the reaction mixture affect the speed of polymerization, thus, for a given reaction time, the polymerization degree increases as the polymerization speed increases. For the same kind of polymer, the higher the polymerization degree is, the greater the viscosity becomes, and the phase transition temperature varies as well. In addition, for a specific cholesteric phase liquid crystal, the helical twisting power varies with the polymerization degree and thus affects the pitch size of the cholesteric phase liquid crystal.

In the above embodiments, a substrate surface can be coated with a knife coating method or screen printing, roll-to-roll processing and other coating technologies. Alternatively, an ink-jet printing technology can also be used to deposit the polymer on the substrate surface. In each case, the final product is a layer of reflective cholesteric type material on the substrate surface. In addition, 3D printing technology can be used to prepare a cholesteric fiber or other three-dimensional structures. In this case, the viscosity of the polymer can be adjusted by changing the polymerization degree to make the polymer particularly suitable for the 3D printing technology, and the coating of the cholesteric polymer allows further processing to modify its properties.

In a preferred embodiment of the first embodiment, a polymerization reaction between a diacrylate liquid crystal and an amine is carried out as follows: the amine reacts with the diacrylate liquid crystal through a Michael addition reaction to form a secondary amine, and the secondary amine further reacts with another diacrylate liquid crystal to form a tertiary amine.

In a preferred embodiment of the first embodiment, heating may be performed when carrying out the polymerization reaction. The amine and the diacrylate may be heated and stirred in a vessel at a certain temperature for a certain period of time (which may be designed as needed) to carry out the polymerization reaction. In this process, the amine reacts with the diacrylate liquid crystal to form a secondary amine through a Michael addition reaction, and then the secondary amine reacts with another diacrylate to form a tertiary amine until the reaction of the mixture is completed so as to form a main chain cholesteric phase liquid crystal polymer.

Figure 2:
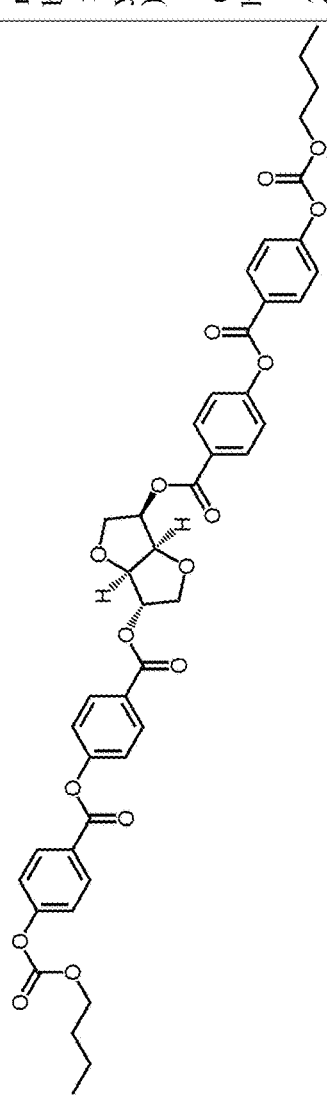
FIG. 2 is an exemplary structure diagram of a diacrylate liquid crystal and a primary amine for the above embodiment.
Figure 2:
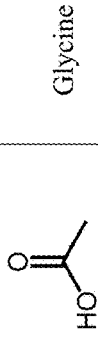

In a preferred embodiment of the first embodiment described above, various diacrylate liquid crystals and amines can be used in the reaction mixture, with different choices forming different polymers with different properties. However, the main chain cholesteric phase liquid crystal polymer can be formed as long as the reaction mixture contains a cholesteric phase diacrylate liquid crystal, or turns to be a cholesteric type after carrying out the polymerization reaction. FIG. 2 illustrates a non-exhaustive list of available molecules of diacrylate liquid crystals and amines and a structure diagram thereof. For example, butylamine can be used as the amine After being prepared in batches, the main chain cholesteric phase liquid crystal polymer may be coated onto the surface of the substrate by blade coating or other coating technologies.

In a further improvement of the above first embodiment, since the polymerization degree can be determined by the reaction time, the reaction temperature, and the concentration of the reaction mixture in the case of using a solvent, and a higher polymerization degree may result in a higher viscosity, an appropriate amount of non-reactive solvent can be added into the coating mixture to reduce the viscosity so as to assist in alignment of the coating in a coating process. The solvent may be an organic solvent with non-liquid crystal phase, comprising but not limited to tetrahydrofuran, dichloromethane or toluene, or may be a small molecule liquid crystal having a liquid crystal phase. Any organic molecules capable of reducing viscosity and causing no damage to the polymer and coating property can be used as the solvent herein.

In a further improvement of the above first embodiment, an alignment layer can also be added onto the substrate to assist in uniform alignment of molecules, but in most cases, shear force generated during the coating process is sufficient to induce molecular alignment. Therefore, this step is optional. The alignment layer may be formed by spin coating an aqueous polyvinyl alcohol solution or a polyimide solution on a glass substrate, followed by rubbing from top to bottom on a velvet cloth.

Figure 3:
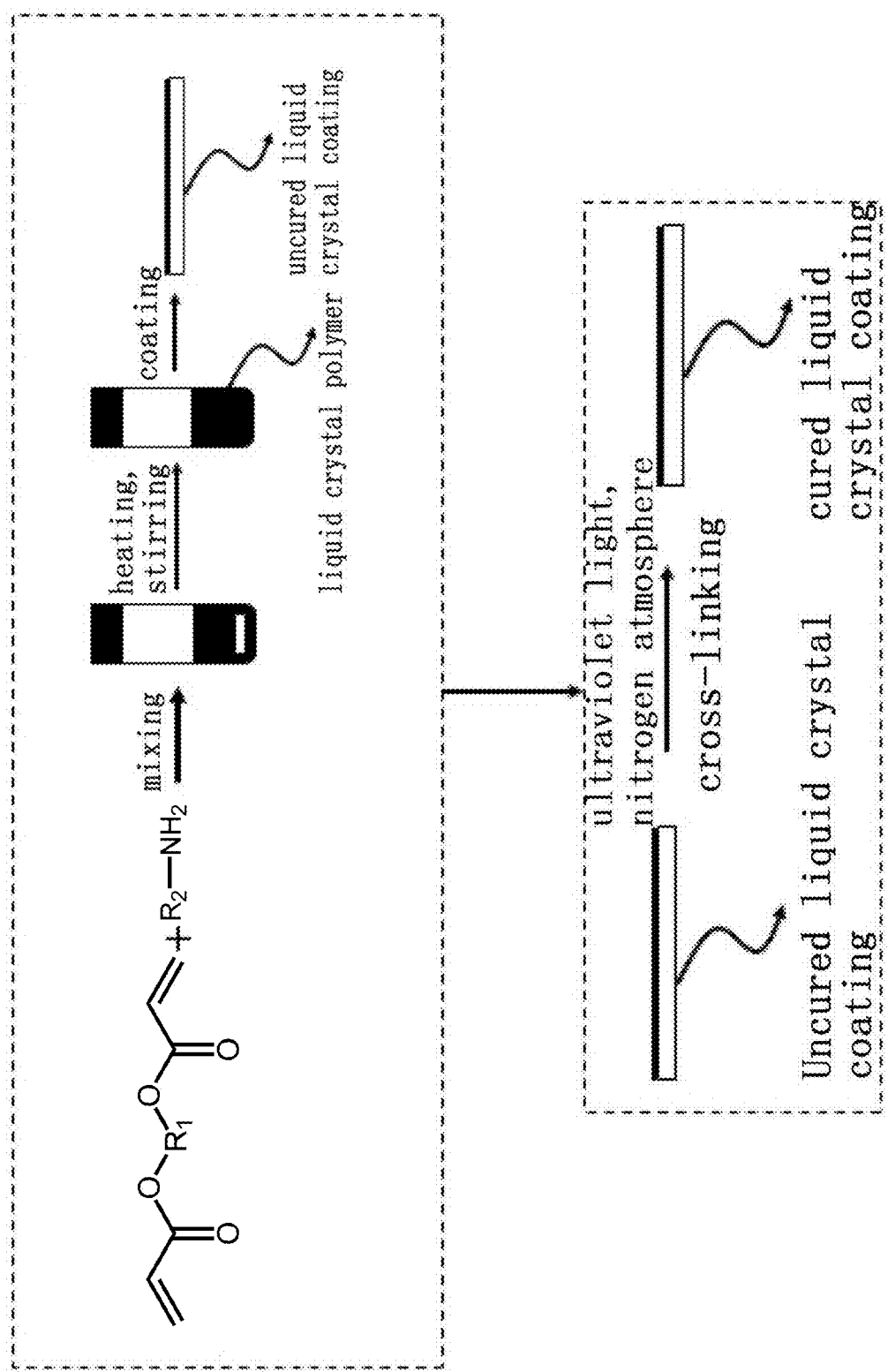
FIG. 3 is a flow diagram of a preparation method for a light reflecting coating according to another embodiment of the present disclosure.

According to a second embodiment of the present disclosure, a preparation method for temperature-responsive light reflecting coating is provided. As shown in FIG. 3, the method includes the basic steps of the second embodiment described above, and based on the first embodiment described above, may further include a step of cross-linking the main chain cholesteric phase liquid crystal polymer to obtain a polymer network so as to form a solid coating.

In a further improvement of the above second embodiment, the molar ratio of the diacrylate liquid crystal to the amine may be controlled so that acrylate end groups are present in the main chain cholesteric phase liquid crystal polymer. The molar ratio of the diacrylate liquid crystal to the amine plays an important role because when any one of the acrylate liquid crystal and the amine is present in excess, the other will be used up before the completion of the reaction, thus limiting the growth of the chain length. In addition, the molar ratio and other parameters (e.g., the reaction temperature, the reaction time and the concentration of the reaction mixture) determine the end groups of the polymer, with possible outcomes being the end groups being all acrylates, all secondary amines, or both acrylates and secondary amines in a certain ratio. A polymer network can be obtained through a cross-linking reaction as long as some acrylate end groups are presented in the polymer. Therefore, when performing the cross-linking reaction, the type of the polymer end group is very important because the cross-linking reaction is carried out mainly by radical polymerization of the main chain cholesteric phase liquid crystal polymer.

In a further improvement of the above second embodiment, the method may further comprise a step of adding a radical initiator in the main chain cholesteric phase liquid crystal polymer before coating the main chain cholesteric phase liquid crystal polymer onto the substrate to form a light reflecting coating. The radical initiator may form a radical or a cation by absorbing ultraviolet light radiant energy, which initiates a radical polymerization reaction of a monomer or an oligomer. The radical initiator comprises but not limited to Irgacure-651 and Irgacure-184.

In order to illustrate the preparation process of the above first or second embodiment more directly, Table 1 shows the influence of various parameters in the preparation process on the properties of the final polymer.

TABLE 1

List of the most important parameters and properties for preparing a temperature-responsive light reflecting coating of the present disclosure

| | Batch reaction | | Coating | Post processing |
|---|---|---|---|---|
| Process | Reaction mixture | | Polymerization Coating | Cross-linking |

TABLE 1-continued

List of the most important parameters and properties for preparing a
temperature-responsive light reflecting coating of the present disclosure

| | Batch reaction | Coating | Post processing |
|---|---|---|---|
| Parameters | acrylate structure (CH$_2$=CH-C(=O)-O-R$_1$-O-C(=O)-CH=CH$_2$); R$_2$—NH$_2$<br>Temperature<br>Time<br>Reactant ratio<br>Solvent<br>Concentration | Coating method<br>Solvent<br>Temperature<br>Slit width/coating rate<br>Alignment layer | Temperature<br>Curing time<br>Additives<br>Type and ratio of end group |
| Properties | Phase transition temperature<br>Type of liquid crystalline phase<br>Viscosity<br>Degree of temperature response | Polymerization degree<br>Ratio of end group | Alignment<br>Coating thickness<br>Cross-linking degree |

Figure 4:
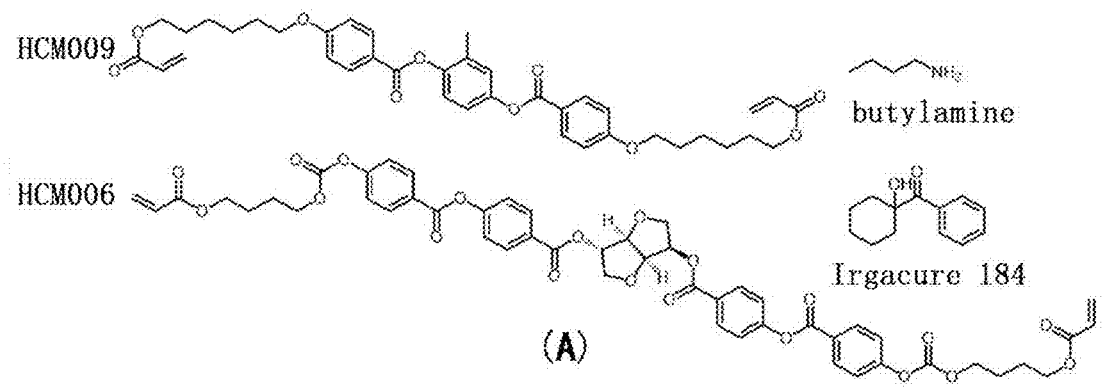
FIGS. 4A-E is an embodiment of an actual preparation of a light reflecting coating according to the flow diagram of FIG. 3.
Figure 4:
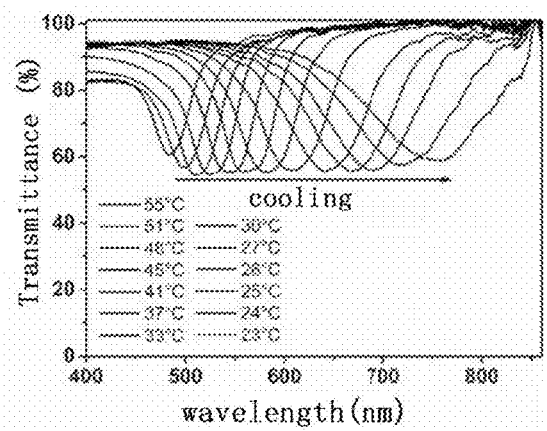
Figure 4:
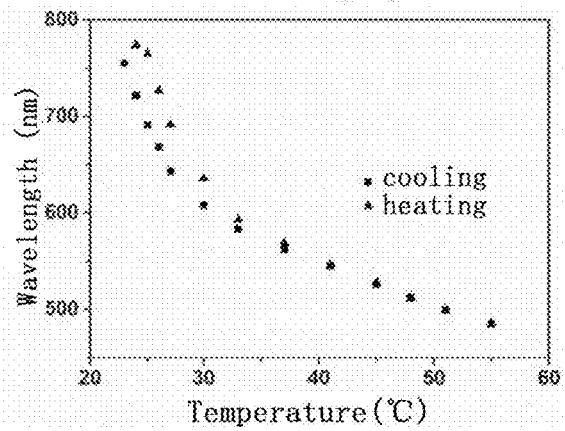
Figure 4:
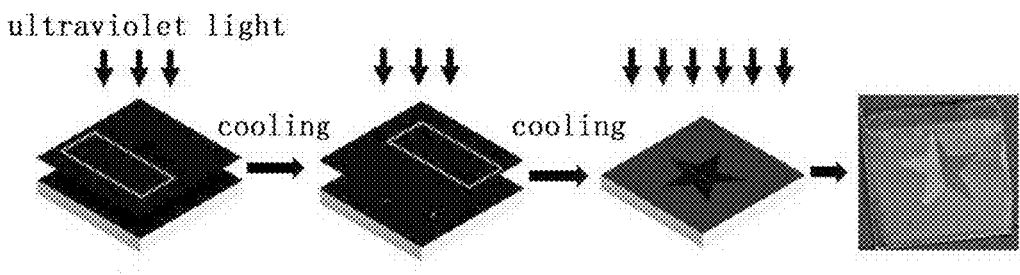
Figure 4:
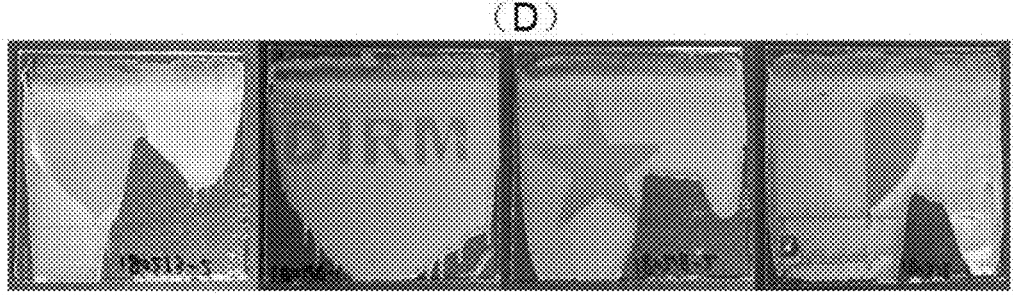

In order to further illustrate the technical effects of implementing various embodiments of the present disclosure, an embodiment of actually preparing a light reflecting coating according to the flow diagram of FIG. 3 is implemented, as shown in FIG. 4-E. In this example, a mixture of an achiral liquid crystal diacrylate, a chiral liquid crystal diacrylate and butylamine as shown in FIG. 4A is used for the polymerization reaction. Firstly, the reaction mixture is heated to form a polymer of a short chain length, and then photoinitiator Irgacure-184 is added, and the polymer is coated on a glass substrate by knife coating to obtain a temperature-sensitive cholesteric type reflecting coating. FIG. 4B illustrates the reflection spectrum of the reflecting coating at different temperatures. FIG. 4C illustrates the curve of the reflection wavelength of the reflecting coating varying with temperature. It is found in the experiment that this coating has a good long-term stability. Secondly, different portions of the coating may be irradiated with ultraviolet light at different temperatures using a photomask to partially cross-link the coating. The reflected wavelength is fixed in this cross-linking step due to the short length of polymer. FIG. 4D illustrates a process for patterning the reflecting coating by using a star-shaped photomask to achieve partial cross-linking, as well as a final actual coating sample. By the manner of FIG. 4D, various patterns as shown in FIG. 4E can be created.

According to a third embodiment of the present disclosure, a temperature-responsive light reflecting coating comprising a substrate and a main chain cholesteric phase liquid crystal polymer which is coated onto the substrate is provided, wherein the main chain cholesteric phase liquid crystal polymer is formed by a polymerization reaction between an diacrylate liquid crystal and an amine, the diacrylate liquid crystal comprises a chiral diacrylate liquid crystal, and the reflection wavelength of the reflecting coating is determined by the content of the chiral acrylate liquid crystal and the polymerization degree of the main chain cholesteric phase liquid crystal polymer formed. This example can be prepared by the method described in the first or second embodiment, and some properties of the light reflecting coating in the two embodiments can be alternatively used and replaced. The structures or properties of the light reflecting coating in all the preparation methods of the first or second embodiment are implicit in the present embodiment.

In addition, although the terms, such as first, second, third and the like, may be used herein to describe a variety of information, such information should not be limited by these terms. These terms are merely used to distinguish one from another among the same types of information. For example, without going beyond the scope of the present disclosure, a first information may also be referred to as a second information. Similarly, a second information may also be referred to as a first information.

While some preferred embodiments of the present disclosure have been described in detail in the foregoing description, the present disclosure should not be limited by these embodiments. Various equivalent modifications or replacements can be made by those skilled in the art without departing from the spirit of the present disclosure, and such equivalent modifications or replacements fall within the scope defined by the appended claims.

The invention claimed is:

1. A preparation method for a temperature-responsive light reflecting coating, comprising:
    forming a main chain cholesteric liquid crystal polymer by a polymerization reaction between an acrylate liquid crystal and an amine, wherein the acrylate contains chiral acrylate, and
    coating the main chain cholesteric liquid crystal polymer on a substrate to form a light reflecting coating, and the reflection wavelength of the light reflecting coating is determined by at least one of: temperature at which cross-linking is performed, content of the chiral acrylate liquid crystal, and the polymerization degree of the main chain cholesteric liquid crystal polymer formed;
    and successively cross-linking the main chain cholesteric liquid crystal polymer on each of a plurality of portions of the light reflecting coating at a temperature different from that of another portion of the light reflecting coating using a photomask, to fix the reflecting wavelength of each portion of the light reflecting coating and cure the light reflecting coating, thus forming a desired pattern with portions reflecting different wavelengths.

2. The preparation method for a temperature-responsive light reflecting coating according to claim 1, wherein the polymerization reaction between the acrylate liquid crystal and the amine is carried out as follows:

the amine reacts with the acrylate liquid crystal to form a secondary amine through Michael addition reaction, and the secondary amine reacts with another acrylate liquid crystal to form a tertiary amine.

3. The preparation method for a temperature-responsive light reflecting coating according to claim 2, wherein the amine is a primary amine and/or the acrylate liquid crystal is a diacrylate liquid crystal.

4. The preparation method for a temperature-responsive light reflecting coating according to claim 3, wherein heating is performed when carrying out the polymerization reaction.

5. The preparation method for a temperature-responsive light reflecting coating according to claim 1, wherein an alignment layer is added onto the substrate to assist alignment of molecules.

6. The preparation method for a temperature-responsive light reflecting coating according to claim 2, further comprising a step of cross-linking the main chain cholesteric liquid crystal polymer to obtain a polymer network so as to form a solid coating.

7. The preparation method for a temperature-responsive light reflecting coating according to claim 6, wherein the molar ratio of acrylate liquid crystal to amine is controlled so that acrylate end groups are present in the main chain cholesteric liquid crystal polymer.

8. The preparation method for a temperature-responsive light reflecting coating according to claim 7, wherein ultraviolet irradiation is carried out to initiate radicals of the main chain cholesteric liquid crystal polymer to cross-link.

9. The preparation method for a temperature-responsive light reflecting coating according to claim 8, wherein the method, before coating the main chain cholesteric liquid crystal polymer onto the substrate, further comprises a step of adding a radical initiator in the main chain cholesteric liquid crystal polymer.

10. A temperature-responsive light reflecting coating formed by the method as claimed in any one of claim 1, comprising a substrate and a main chain cholesteric liquid crystal polymer coated on the substrate.

11. The preparation method for a temperature-responsive light reflecting coating according to claim 2, wherein the amine is a primary amine or the acrylate liquid crystal is a diacrylate liquid crystal.

* * * * *